Patented Dec. 30, 1952

2,623,896

UNITED STATES PATENT OFFICE 2,623,896

METHOD FOR STABILIZING CYANOHYDRINS AND RESULTING PRODUCT

Helmut Beier, Frankfort-on-the-Main, Germany, assignor to Röhm & Haas G. m. b. H., Darmstadt, Germany No Drawing. Application March 3, 1952, Serial No. 274,673. In Germany October 6, 1949

5 Claims. (Cl. 260—465.6)

The invention relates to the stabilization of cyanohydrins and to the resulting product.

The present application is a continuation-in-part of my application Serial No. 186,670, filed September 25, 1950, entitled "Method for Stabilizing Cyanohydrins."

It is known that the cyanohydrins, which are unstable per se and have a tendency to decompose or polymerize, can be stabilized by the addition of acids. Although this manner of stabilizing cyanohydrins is known and is also described in detail in the patent literature, it was heretofore not possible to prevent decomposition or polymerization of formaldehyde-cyanohydrin with such a degree of certainty that its exceptional properties, particularly its outstanding dissolving capacity for sparingly soluble materials, for example certain acrylic compounds, remain unimpaired. That the stabilizing action in the past was insufficient is seen in the fact that pure formaldehyde-cyanohydrin is unknown as a commercial product and that it is marketed solely in the form of a 50% aqueous solution stabilized with phosphoric acid.

It has now been found that monochloracetic acid constitutes an outstanding stabilizer for formaldehyde-cyanohydrin and that additions of a small quantity, preferably about 1 to 2% of this acid, are sufficient for preventing decomposition of the nitrile or polymerization thereof even at elevated temperature, for example during vacuum distillation. The stabilizing action of the monochloracetic acid is retained even under severe conditions which are encountered when the formaldehyde-cyanohydrin is used as a solvent for fiber-forming highly polymeric materials during dry-spinning operations. Especially important is the fact that monochloroacetic acid during distillation passes over with the nitrile. Its stabilizing action is therefore effective in the still as well as in the vapor phase and in the distillate.

The surprising fact was also discovered that monochloroacetic acid, with respect to its stabilizing action for formaldehyde-cyanohyrin, stands out conspicuously among the series of all acids that are known to stabilize cyanohydrins. Even when compared to the very closely related di- and trichloroacetic acids it is possible to determine a great difference in the above mentioned properties, both these acids being substantially without effect as stabilizers for formaldehyde-cyanohydrins.

This entirely different behavior of mono- and trichloroacetic acids could be attributed to the dissimilar acidity thereof, which corresponds to $1.4 \times 10^{-3}$ in the case of monochloroacetic acid and $2.0 \times 10^{-1}$ in the case of trichloroacetic acid. However, in the case of dichloroacetic acid its similarity to monochloroacetic acid, with respect to chemical structure, as well as boiling point (189 and 194° C.) and dissociation constants ($1.4 \times 10^{-3}$ and $3.3 \times 10^{-2}$), is so great that no explanation for the wide disparity in the action of both acids can be given at this time; it can be merely recorded as a surprising fact.

Instead of monochloroacetic acid it is, of course, possible to add substances capable of forming, under the reaction conditions, the free acid according to the invention, for example salts of monochloroacetic acid in the presence of a mineral acid, monochloroacetic acid chloride and similar compounds.

Example

The solution of formaldehyde-cyanohydrin obtained by passing hydrogen cyanide into an aqueous solution of formaldehyde is treated with 1.5% of monochloroacetic acid, calculated on the amount of formaldehyde-cyanohydrin present in the solution, and distilled in vacuo. After the water and a first run have been driven off, a water-clear nitrile containing monochloroacetic acid passes over at 98° and 10 mm. pressure, whereas 1.5 to 2% remain behind as a brown syrup. Upon redistilling the nitrile, the latter passes over without leaving any residue.

I claim:

1. A process for stabilizing formaldehyde-cyanohydrin, which comprises adding monochloroacetic acid.

2. A process according to claim 1, wherein the quantity of added monochloroacetic acid is approximately 1 to 2%.

3. A process according to claim 1, wherein the added monochloroacetic acid is approximately 1.5% calcualted on the quantity of formaldehyde-cyanohydrin present.

4. A process of stabilizing formaldehyde-cyanohydrin, which comprises adding a small quantity of monochloroacetic acid to a solution of formaldehyde-cyanohydrin obtained by passing hydrogen cyanide through an aqueous solution of formaldehyde, and distilling in vacuo.

5. Formaldehyde-cyanohydrin stabilized by the addition of a small quantity of monochloroacetic acid.

HELMUT BEIER.

REFERENCES CITED

The following references are of record in the file of this patent:

UNITED STATES PATENTS

| Number | Name | Date |
|---|---|---|
| 2,175,805 | Jacobson | Oct. 10, 1939 |